US006782299B1

(12) United States Patent
Tsuji et al.

(10) Patent No.: US 6,782,299 B1
(45) Date of Patent: Aug. 24, 2004

(54) METHOD AND APPARATUS FOR DIGITAL SIGNAL PROCESSING, METHOD AND APPARATUS FOR GENERATING CONTROL DATA, AND MEDIUM FOR RECORDING PROGRAM

(75) Inventors: Minoru Tsuji, Chiba (JP); Kenichi Imai, Tokyo (JP); Takashi Koike, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/381,880

(22) PCT Filed: Feb. 9, 1999

(86) PCT No.: PCT/JP99/00557

§ 371 (c)(1), (2), (4) Date: Sep. 24, 1999

(87) PCT Pub. No.: WO99/40566

PCT Pub. Date: Aug. 12, 1999

(30) Foreign Application Priority Data

Feb. 9, 1998 (JP) ........................................ P10-027584

(51) Int. Cl.[7] ................................................ G06F 17/00
(52) U.S. Cl. ..................................... 700/94; 434/307 A
(58) Field of Search ............... 84/609, 645; 434/307 A; 700/94

(56) References Cited

U.S. PATENT DOCUMENTS

| | | | | | |
|---|---|---|---|---|---|
| 5,300,725 | A | * | 4/1994 | Manabe | 84/609 |
| 5,450,597 | A | | 9/1995 | Klappert et al. | 395/800 |
| 5,569,869 | A | | 10/1996 | Sone | 84/609 |
| 5,770,811 | A | * | 6/1998 | Haino | 84/464 R |
| 6,053,740 | A | * | 4/2000 | Nakata et al. | 434/307 A |
| 6,283,764 | B2 | * | 9/2001 | Kajiyama et al. | 434/307 A |

FOREIGN PATENT DOCUMENTS

| | | | |
|---|---|---|---|
| EP | 0484047 A2 | 5/1992 | G10H/1/00 |
| JP | 3-48288 | 3/1991 | G10G/1/00 |
| JP | 6-165033 | 6/1994 | H04N/5/275 |
| JP | 7-140974 | 6/1995 | G10H/1/00 |
| JP | 7-111624 | 11/1995 | G10H/1/00 |

* cited by examiner

*Primary Examiner*—Minsun Oh Harvey
*Assistant Examiner*—Brian Pendleton
(74) *Attorney, Agent, or Firm*—Sonnenschein, Nath & Rosenthal LLP

(57) ABSTRACT

Audio control data extracted from SMF data by a data decoder section is supplied to an audio decoder section. The audio decoder section receives the audio control signal and generates a tone as an audio output in accordance with the audio control signal. If the decoding period by the audio decoder section is sufficiently short, the performance tone and the audio output create synchronized sounds because the audio control signal is decoded from a Meta event of the SMF data.

27 Claims, 11 Drawing Sheets

METHOD AND APPARATUS FOR DIGITAL SIGNAL PROCESSING, METHOD AND APPARATUS FOR GENERATING CONTROL DATA, AND MEDIUM FOR RECORDING PROGRAM

TECHNICAL FIELD

The present invention relates to a digital signal processing method and an apparatus thereof for synchronously reproducing a performance tone signal output from a sound source storing a plurality of instrument information items, synchronized with a digital signal other than the performance tone signal, a control data generation method and an apparatus thereof for generating control data which enables the synchronous reproduction, and a program recording medium for recording a program which enables the synchronous reproduction.

BACKGROUND ART

Musical Instrument Digital Interface (MIDI) is widely used as an interface for controlling performance of instruments in which control data is supplied to a sound source storing instrumental tones to thereby generate performed tones of instruments from the sound source. At present, MIDI is taken as the standard interface for externally controlling electronic instruments.

A MIDI signal represents a digitally encoded performance parameter of a corresponding electronic instrument or the like, and a performance can be corrected by correcting a code even after encoding. Recording, editing, and reproduction of a MIDI signal is carried out with a sequencer or a sequencer software, and MIDI signals are treated in form of a MIDI file.

Also, a standard MIDI file (SMF) is known as the unified standard for maintaining compatibility between different sequencers or different kinds of sequencer software. The SMF is composed of data units called "chunks". The "chunks" define data pieces called a header chunk and a track chunk. The header chunk is set at the top of a SMF file and describes basic information concerning the data in the file. The track chunk is composed of time information (Delta-Time) and events. The event represents an action, event or the like which will change any of the items of the data file. Events of MIDI file data formatted in the SMF format are roughly classified into three types of events, i.e., MIDI events, SysEx events (system exclusive events), and Meta events.

MIDI events directly express performance data. SysEx events mainly express system exclusive messages for MIDI. System exclusive messages are used to exchange information peculiar to a specific instrument and to transmit special non-musical information, event information, and the like. Meta events express additive information such as information indicating tempo, time, and the like concerning the entirety of a performance, information including words of a song used by sequencer software, or copyright information. Every Meta event begins with 0xFF which is followed by a byte representing the event type, and the data length and data itself further follow. The MIDI performance program is designed so as to ignore those Meta events that cannot be recognized by the program itself.

Each event is added with timing information concerning the timing when the event is executed. The timing information is represented as a time difference from execution of a previous event immediately before the present event. For example, if the timing information is "0", the present event added with this information is executed at the same time when the previous event is executed.

In general, music reproduction using the MIDI standard adopts a system in which various signals and tones peculiar to instruments are modeled, and a sound source which stores the data of the modeling is controlled by various parameters. Therefore, it is difficult to express those sounds that are difficult to model or that have not yet been studied sufficiently, such as human voices and natural sounds.

Consequently, reproduction of music according to the MIDI standard is limited at most to performance of musical instruments and the like, but cannot cover singing voices and the like.

Hence, demands have appeared for a synchronous reproduction technique for synchronously reproducing audio signals such as human voices which are not performed tones, and performed tones based on MIDI signals together.

Although there has been a system like certain sequencer software which synchronizes performed tones based on MIDI signals with audio signals such as vocals. Synchronous reproduction described above has been so complicated and less extendable that it can be achieved only with such sequencer software.

Not only the above-mentioned audio signals which are not performed tones but also image signals and text signals may be considered as objects to be synchronized with MIDI signals. Expansion to unified media has thus been expected. In addition, data transmission via networks have been carried out frequently in recent years, and the unified media may naturally be subjected to such data transmission. Therefore, systems via networks require a technique which enables synchronous reproduction as described above, easy operation, and high extendibility. Also desirable is a technique capable of easily correcting data as in the case of MIDI data.

DISCLOSURE OF THE INVENTION

The present invention has an object of providing a digital signal processing method and an apparatus thereof which are capable of realizing synchronous reproduction of the signal of a performance tone and another signal than the performance tone signal, with use of control data described in interface data for the instrumental performance, without influencing the reproduction from the sound source.

Also, the present invention has another object of providing a control data generating method and an apparatus thereof, which are capable of generating interface data containing control data for synchronizing the performance tone signal with another digital signal than the performance tone signal.

Further, the present invention has another object of providing a program recording medium as software which enables synchronous reproduction of the performance tone signal and another digital signal than the performance tone signal, at any place for any person where an appropriate apparatus is available.

To achieve the above objects, in the digital signal processing method according to the present invention, a performance tone signal based on interface data for an instrumental performance, which contains at least performance data for causing a sound source storing plural pieces of instrumental tone information to generate a performance tone of an instrument, and a digital signal other than the performance tone signal are reproduced on the basis of control data previously encoded and described in the interface data.

More specifically, the reproduction timing, the parameters, and the like of an audio signal, image signal, or a text signal which are different from the performance tone signal are controlled with use of control data previously described in the interface data.

This control data is described in a sequencer specific event among events of MIDI data formatted in the SMF format. A manufacturer of a sequencer can write original data in the sequencer specific event. The control data can be easily treated like the other events of the SMF.

The control data described on the sequencer specific event is constructed by a combination of an ID code indicating the type of the control event indicating the content of control, and the control-amount/control-method thereof.

Also, by assigning an ID such as a number or the like to every data piece of data of the audio signal or image signal as the object to be controlled, an arbitrary data piece can be controlled even when a plurality of data pieces exist. The ID can be added to the data by a method of providing a header portion for data.

Therefore, an ID code of the data as the object to be controlled may be contained in control data. Also, it is possible to contain an ID code indicating the type of the control signal, e.g., whether the signal as the object to be controlled is an audio signal, image signal, or text data.

The data to be recorded as control data such as an ID described above is expressed in form of a simple bit string and can be easily treated like data according to the MIDI standard.

Also, the digital signal processing apparatus according to the present invention comprises: first decoding means for decoding control data previously encoded and described in interface data for an instrumental performance, which contains at least performance data for causing a sound source storing plural pieces of instrumental tone information to generate a performance tone of an instrument; and second decoding means for decoding a digital signal other than a signal of the performance tone, in correspondence with reproduction timing information of the performance data, on the basis of the control data decoded by the first decoding means.

Further, the control data generating method according to the present invention comprises a step of generating interface data containing control data for synchronizing a digital signal other than a performance tone signal, with the performance signal output from a sound source which stores plural pieces of instrumental tone information.

Further, the control data generating apparatus according to the present invention comprises means for generating interface data containing control data for synchronizing a digital signal other than a performance tone signal, with the performance signal output from a sound source which stores plural pieces of instrumental tone information.

Also, the program recording medium according to the present invention includes a program recorded therein, which comprises: a first step of decoding control data previously encoded and described in interface data for instrumental performance, which contains at least performance data for causing a sound source storing plural pieces of instrumental tone information to generate a performance tone of an instrument; and a second step of decoding a digital signal other than a signal of the performance tone, in correspondence with reproduction timing information of the performance data, on the basis of the control data decoded by the first step.

BEST MODE FOR CARRYING OUT THE INVENTION

In the following, embodiments of the present invention will be explained with reference to drawings. First, explanation will be given for an embodiment of a digital signal processing method and apparatus thereof applied to a digital signal processing apparatus which synchronously reproduces performance tone signals based on MIDI signals according to Musical Instrument Digital Interface (MIDI) widely used as an interface for controlling a performance of musical instruments, synchronized with digital signals other than the performance tone signals.

More specifically, the apparatus realizes the digital signal processing method according to the present invention with which performance tone signals based on interface data for performing an instrument, including at least performance data for generating a tone of an instrument, and digital signals other than the tone signals are reproduced by a MIDI sound source storing a plurality of instrumental tone information items on the basis of control data previously encoded and described in the interface data.

In particular, the digital signal processing apparatus may use vocal audio signals based on human voices, as an example of the digital signals other than the performance tone signals, in the following explanation. This apparatus can be considered similarly to an apparatus called a sequencer. The objects to be synchronized with the performance tone signals, however, are not only audio signals but also may be image signals, text signals, and the like.

Figure 1:
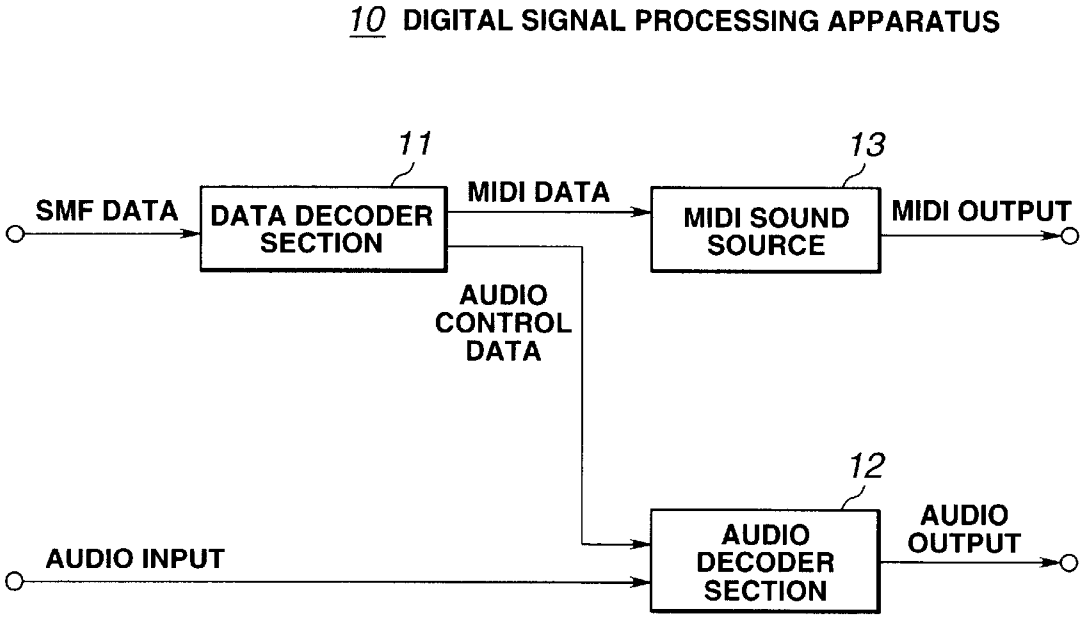
FIG. 1 is a block diagram showing the structure of a digital signal processing apparatus as an embodiment of the digital signal processing method and the apparatus thereof according to the present invention.

FIG. 1 shows the structure of a digital signal processing apparatus 10 as the embodiment described above. The digital signal processing apparatus 10 is supplied, through the Internet, with standard MIDI file (SMF) data and vocal audio signals as described above transmitted from an encoder side.

The SMF data is data based on the unified standard which allows compatibility between different sequencer or sequencer software programs. The SMF data does not directly control a MIDI sound source but operates, for example, a sequencer software program to generate MIDI signals. Based on the MIDI signals, the MIDI sound source outputs performance tone signals.

In the digital signal processing apparatus 10, the SMF data is input to a data decoder section 11. The data decoder section 11 extracts audio control data inserted in the SMF data by the encoder side discussed below, and supplies the data to an audio decoder section 12. The data decoder section 11 extracts MIDI data in the form of parameters from the SMF data and transforms the MIDI data into time-based MIDI signals.

The audio decoder section 12 receives audio control data from the data decoder section 11, and controls the audio signals in accordance with the control data, to reproduce audio signals for vocal, for example.

The audio control data in the SMF data is used to control parameters of audio signals and consists of an ID indicating the type of a control event, the control-amount/control-method thereof. The audio control data is written into the SMF data by the encoder side.

The audio control data is described on a sequence specific event of a Meta event among events of MIDI data formatted in the SMF format. The manufacturer of the sequencer may write original data on the sequence specific event. The control data can be easily treated on the sequence specific event, like other events of the SMF. A code 0x7F as an event type is assigned to the sequence specific event, subsequently to a code 0xFF indicating a Meta event.

The control event indicating the contents of the control according to the audio control data can be expressed in form of a simple bit string by the ID. Also, the control-amount/control-method thereof can be expressed as a simple bit string. For example, definitions thereof may be as suggested in the Table 1 below.

TABLE 1

| Control event ID | Bit string indicating control-amount/control-method | Control content | Default value |
|---|---|---|---|
| 0x1 | 0x0/0x1 | Start(0x0)/stop(0x1) | 0x0 |
| 0x2 | 0x000 ~ 0xfff | Volume control | 0x000 |
| 0x3 | 0x800 ~ 0x000 ~ 0x7ff (Complement of 2) | Pitch control | 0x000 |

TABLE 1-continued

| Control event ID | Bit string indicating control-amount/control-method | Control content | Default value |
|---|---|---|---|
| 0x4 | 0x800 ~ 0x000 ~ 0x7ff (Complement of 2) | Speed control | 0x000 |
| 0x5 | 0x0 ~ 0xf + 0x00 ~ 0xff | Effect type such as Echo and Parameter | 0x000 |
| 0x6 | 0x0/0x1 | Forward reproduction/ Reverse reproduction | 0x0 |
| 0x7 | 0x000 ~ 0xfff | Saturation time to set volume (fade-in) | 0x000 |
| 0x8 | 0x000 ~ 0xfff | Time to forced stop from start of reproduction (except 0xfff which means no forced stop) | 0xfff |
| 0xf | 0x000 ~ 0xfff | Execution timing of control (after X$\mu$ seconds) | 0x000 |

In audio control data suggested in the Table 1 and described on the sequence specific event of the Meta event, "Start reproduction of an audio signal" is defined when the ID of the control event is 0x1 and the bit string indicating the control-amount/control-method is 0x0. When the bit string indicating the control-amount/control-method is 0x1 with the ID of the control event not changed, the audio control data defines "Stop reproduction of an audio signal".

When the control event ID is 0x2, the content of control is volume control. Since the bit string indicating the control-amount/control-method is 0x000'0xfff, volume control to the step 111111111111 from 000000000000 is defined.

When the control event ID is 0x3, the control content is pitch control. 0x800~0x000~0x7ff defines pitch control from 0x000 (=000000000000) to the step 0x800 (=100000000000) in the positive direction and to the step 0x7ff (=011111111111) in the negative direction. When the control event ID is 0x4, speed control of the same control amount as above is defined.

When the control event ID is 0x5, the control content is an effect such as echo or the like, and specifically, 0x0'0xf and +0x000'0xf as the control-amount/control-method define the type of the effect and the parameter thereof. In addition, when the control event ID is 0x6, the control-amount/control-method of 0x0/0x1 defines forward-reproduction/reverse-reproduction.

When the control event ID is 0x7, the saturation time of fade-in to a set value is specified, and the control amount of 0x000~0xfff is defined. When the control ID is 0x8, the time at which reproduction is forcedly stopped after starting reproduction is specified, and the control amount of 0x000~0xfff is defined.

Further, when the control event ID is 0xf, the timing at which the control is executed is defined by the control amount of 0x000~0xfff. In this case, the unit time is $\mu$ second, and it is specifically defined that the control is executed after $\mu$ seconds.

In each event of the SMF, tone generation or control is described with a real time timing. However, in the present invention, the control event in the control data can define that actual control can be executed at a timing on a different time base. Specifically, the execution timing set by the control event ID "0xf" shown in the Table 1 indicates, with a bit string, a relative timing between the time information set in the Meta event in the track chunk and the timing for actually executing control. It is also considered that the absolute time in the whole reproduction (i.e., the time from the start time of a play of a MIDI sequence) may be expressed with a bit string.

Meanwhile, the length of a bit string required for expressing a control event or a control-amount/method which forms part of control data in the Table 1 varies depending on the contents (or types) of control. For example, start and stop of an audio signal can be expressed with information volume of 1 bit.

However, the tone volume or the like requires information volume of one to several bits in correspondence with the application. Inversely speaking, it is redundant to use several bytes for expressing start/stop of an audio signal.

Accordingly, the length of the bit string indicating the control-amount/control-method in the control data shown in Table 1 becomes less redundant when the bit length is defined for every type of control (or every control event ID) than when a fixed equal bit length is given to every control. In addition, information may be subjected to variable-length encoding in correspondence with the generation probability of the control-amount/control-method of each control.

Figure 2:
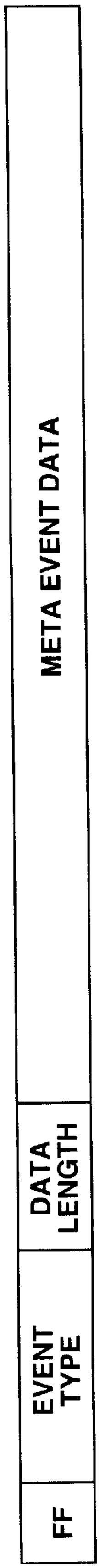
FIG. 2 is a format diagram showing Meta events of SMF data supplied to the digital signal processing apparatus.

Explained below will be a specific example of a Meta event consisting of control data as described above. At first, a track chunk of a SMF is composed of time information and events, as described above, and the events are classified into three types of MIDI events, system exclusive events (SysEx Events), and Meta Events. Time data having a variable length is added to the top portion of each event. FIG. 2 shows a structure of a Meta event where the time data is removed.

The 1 byte [FF] in the left end expresses a Meta event, and the next 1 byte expresses information or the like concerning the entirety of a performance, such as the tempo, time, key, and the like of the performance, in the form of an [Event Type]. Further, the next [Data Length] expresses the length of the Meta event in units of bytes. The other remaining bytes are the contents of the Meta event.

In this Meta event, audio control data for controlling an actual audio signal is described in a sequencer specific event which has [7F] as the [Event Type] described above, as shown in FIG. 3. The manufacturer of the sequencer may write original data in this sequencer specific event.

That is, the top byte of [FF] and the next [Event Type] of [7F] represent that a sequencer specific event in a Meta event is present.

Figure 3:
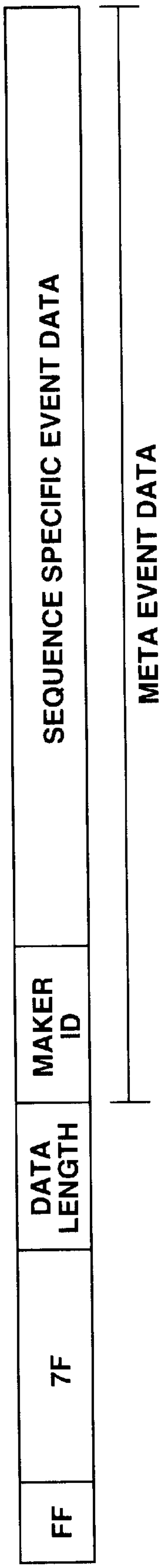
FIG. 3 is a format diagram showing a sequence specific event in the Meta events shown in FIG. 2.
Figure 4:
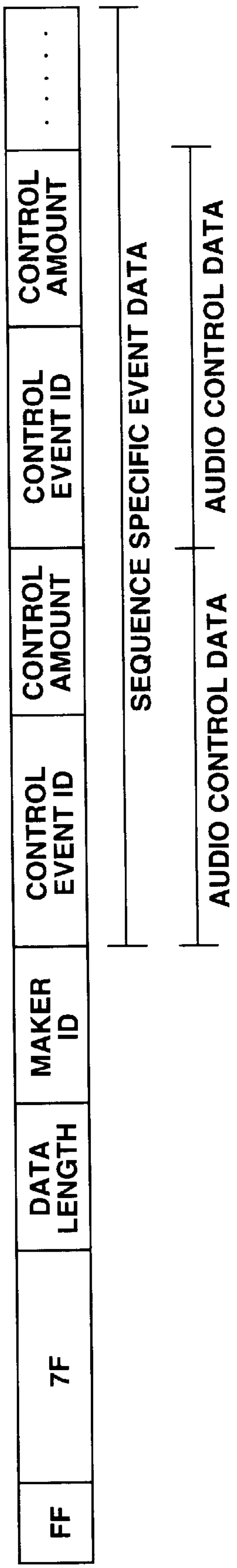
FIG. 4 is a format diagram showing control data described in the sequence specific events in the Meta events shown in FIG. 3.

For example, by recording [Audio Control Data] aligned immediately after the [Maker ID] in the sequencer specific event shown in FIG. 3, a plurality of audio controls can be instructed and simultaneously executed by one sequencer specific event. The [Audio Control Data] is composed of [Control Event ID] and [Control-Amount/Control-Method], as shown in the Table 1. FIG. 4 shows only the [Control Event ID] and the [Control Amount]

Further, a plurality of controls can be instructed and executed by a plurality of sequencer specific events. As control data thereof, an audio signal can be controlled by describing the [Control Event ID] and the [Bit String Indicating Control-Amount/Control Method] as the audio control data shown in the Table 1.

As shown in FIGS. 3 and 4, a Maker ID is described in the Meta event to identify the manufacturer. This is used to identify the manufacturer who has described original data in the sequencer specific event, and is described by the manufacturer. By decoding the sequencer specific event with an apparatus or a software program manufactured by the manufacturer identified by the maker ID or another allowed manufacturer, performance tone signals and other vocal audio signals can be reproduced synchronously. In an apparatus or a software program which cannot identify the maker ID, the contents described in the sequencer specific event are ignored. Therefore, even if a sequencer or a sequencer software program does not correspond to the present invention, reproduction of MIDI signals is executed as usual.

Figure 5:
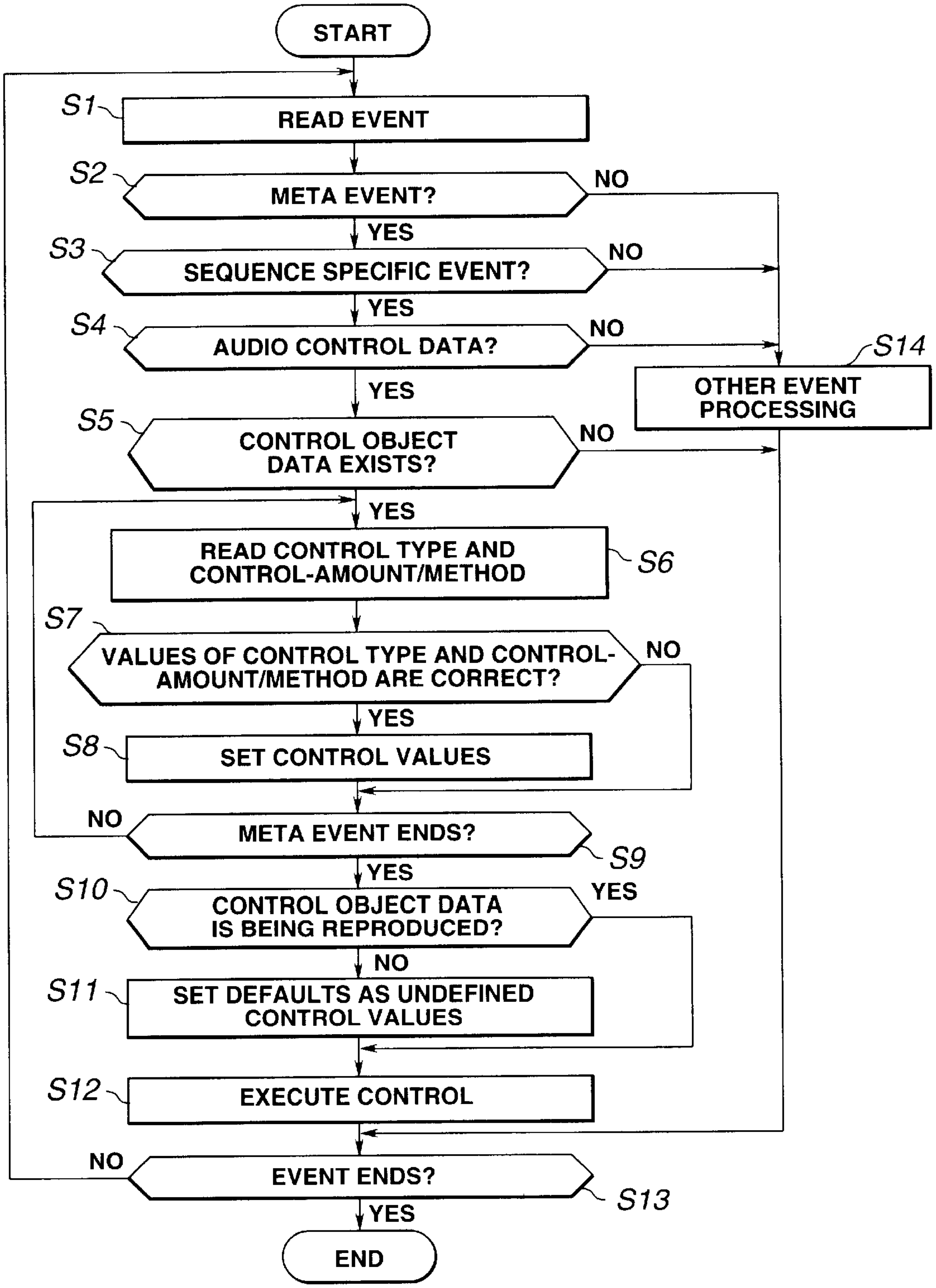
FIG. 5 is a flowchart for explaining operation of the digital signal processing apparatus when SMF data containing control data shown in the format diagram of FIG. 4 is supplied.

With reference to the flowchart in FIG. 5, explanation will now be made of operation of the digital signal processing apparatus 10 shown in FIG. 1 when SMF data constructed in the structure shown in FIG. 4 and a vocal audio signal are supplied from the encoder side. The explanation will be made assuming a precondition that a piece of control object data has already been read into the digital signal processing apparatus 10.

At first, the audio signal processing apparatus 10 takes in the SMF data into a data decoder section 11, and an event is read in the step S1. Further, in the step S2, whether or not the one byte indicating the event type of the MIDI data formatted in the SMF format is [FF] is determined. If the byte indicates [FF], the event is a Meta event and the procedure goes to the step S3.

Next, in the step S3, the [Event Type] is checked to determine whether or not it indicates [7F]. If so, the event is a sequencer specific event, so the procedure goes to the step S4. Further, whether or not audio control data is described in the sequencer specific event is determined in the step S4. More specifically, whether or not the sequencer specific event data contains a control event ID for controlling the audio signal shown in the Table 1, as audio control data. If the audio control data is determined as having been written there, the procedure goes to the step S5.

In the step S5, whether or not control object data exists is determined. That is, determination is made as to whether or not reading of the vocal audio signal as an object to be subjected to the control indicated as the audio control data into the digital signal processing apparatus 10 has been completed. For example, whether or not the audio signal has already been downloaded into the digital signal processing apparatus 10 through a network or the like. At this time, if the control object data is determined as having been existing, the procedure goes to the step S6, and the type (or content) of control and the control-amount/control-method shown in the table 1 are read in as will be explained later.

Note that the flowchart shows the case where only one piece of control object data exists. If no control object data exist, the procedure goes to step S13. To enable processing of plural pieces of control object data, the processing flow should be arranged so as to make control on any one of the pieces of control object data if it exists.

In the step S6, the digital signal processing apparatus 10 reads in the [Control Event ID] and the [Control-Amount/Control-Method] in the audio control data. Further, whether or not the values read in the step S6 are correct is determined in the step S7.

For example, if the control event ID is 0x1 and the bit string indicating the control-amount/control-method is 0x0 or 0x1, the values are determined as being correct, and the procedure goes to the steps S8. Otherwise, if the control event ID is 0x1 as well and the control-amount/control-method is 0x000~0xfff, the type of control and the control-amount/control-method are determined as being incorrect, and the procedure goes to the step S9.

In the step S8, since the control event ID and the bit string indicating the control-amount/control-method are correct, the audio decoder section 12 is set so as to perform decoding of the audio signal, for example, on the basis of the control event ID of 0x1 and the control-amount/control-method of 0x0. The procedure then goes to the step S9.

In the step S9, whether or not the audio control data ends is determined. In case where a plurality of pieces of audio control data are instructed, it is determined that the audio control data does not end. Then, the procedure returns to the step S6 and all the instructed control contents and the control-amount/control-method are read and set. Note that the determination as to the end of a Meta event is made on the basis of the [Data Length] positioned behind the code [7F] expressing a sequencer specific event.

Next, in the step S10, whether or not the control object data which is the audio signal to be controlled is being reproduced is checked. This check is carried out to determine whether or not undefined control values which are not set through the loop for setting control values from the step S6 to the step S8 should be initialized to default values. If the control object data is being reproduced, the procedure goes to the step S12, and control is executed as follows. For example, if the control object data is being reproduced, only the setting value instructed by the audio control data need be reflected. Specifically, when control of the pitch control is described in the audio control data, only the control value thereof is controlled, so the pitch is controlled while the other control values such as the tone volume, speed and the like are kept in the reproducing state.

Otherwise, if the control object data is not being reproduced, the procedure goes to the step S11, and the undefined control values are set to default values.

In the step S12, control of the audio signal is executed at the timing instructed by the time data added to the audio control data. That is, when 0xf is described as the control event ID, the above-described type of control is carried out after ~$\mu$ seconds from the range of 0x000~0xfff indicated as the subsequent control-amount/control-method.

Further, in the step S13, whether or not a sequence of the event is ended is determined, i.e., whether or not the performance is finished is determined.

The processing of the step S14 is carried out to make other event processing, when the event is not determined as a Meta event in the step S2, when the event is not determined as a sequencer specific event in the step S3, or when audio control data is not determined as having been described in the sequence specific event in the step S4. For example, if the procedure is branched from the step S3, a predetermined Meta event corresponding to the [Event Type] is executed. For example, the tempo, time or the like of the MIDI data is controlled.

Meanwhile, the data decoder section 11 supplies the MIDI sound source 13 with MIDI signals decoded from the SMF data, to drive the MIDI sound source 13 to generate tones corresponding to the performance note signals.

The audio decoder section 12 receives audio control data decoded by the data decoder section 11, so an audio output is generated in accordance with the data. If the decoding period in the audio decoder section is sufficiently short, the performance tones and the audio output create synchronized reproduced sounds because the audio control data is decoded from the Meta event in the SMF data.

Thus, when SMF data containing a Meta event in the format as shown in FIG. 4 is supplied, the digital signal processing apparatus 10 does not only reproduce the performance tones based on MIDI signals but also reproduces vocals, natural sounds, and the like, which are difficult to reproduce with musical reproduction according to the MIDI standard, in synchronization with the performance tones.

If the sequencer used to reproduce MIDI signals does respond to the digital signal processing apparatus, control events in SMF data are ignored so that the compatibility of the MIDI data is maintained.

Next explanation will be made of a case where plural pieces of data as objects to be controlled exist and an ID indicating audio signals as the objects to be controlled is added to the audio control data. By adding an ID to sequential control object data pieces as a lump, a specific audio signal can be controlled even when a plurality of audio signals are prepared. That is, the control instructed by a control event in control data is executed with respect to only the control object data having the control object data ID.

Figure 6A:
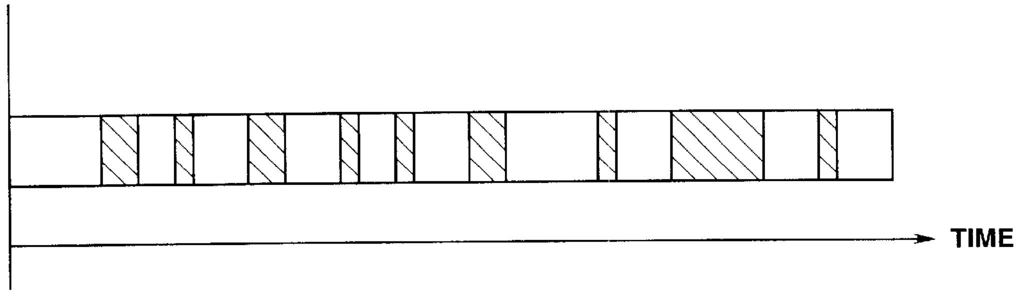
FIG. 6A is a diagram showing audio data including silent parts.

For example, as shown in FIG. 6A, suppose a vocal audio signal containing silent parts marked by oblique hatching. By cutting out the silent parts from the audio signal and dividing the audio signal into a plurality of segments, the total amount of the signal can be reduced.

Figure 7:
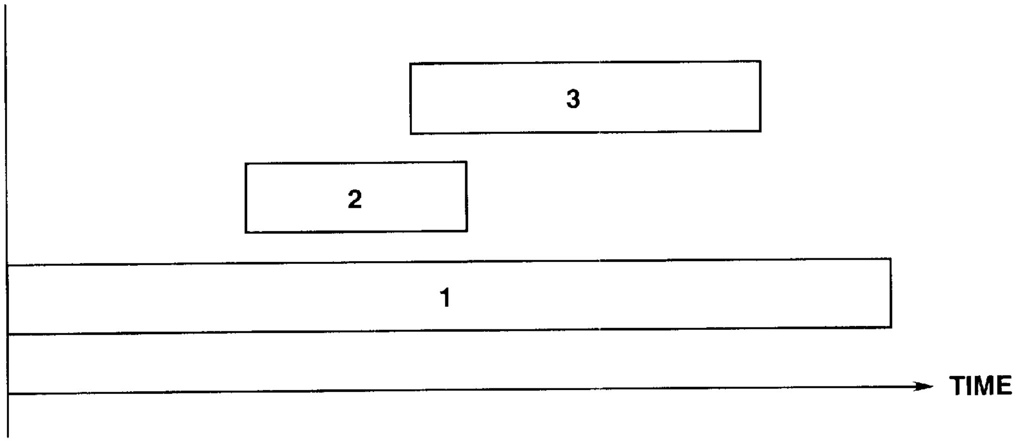
FIG. 7 is a diagram showing audio data existing in a plurality of channels.
Figure 8:
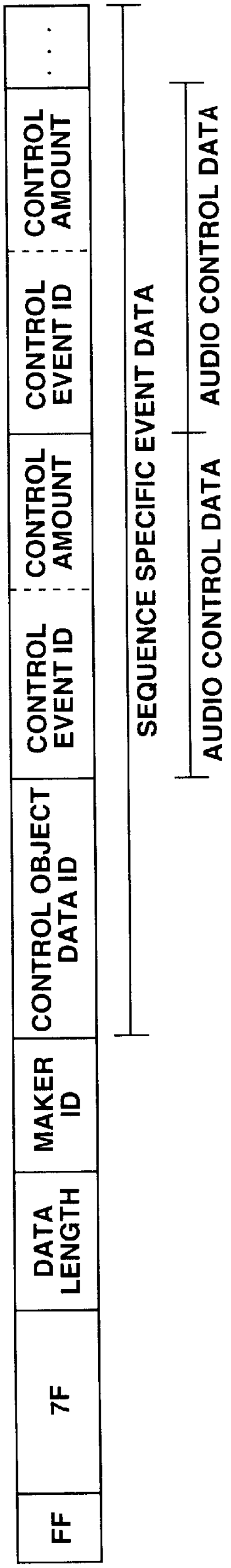
FIG. 8 is a format diagram showing control data added with IDs of control object data.

The [Control Data ID] shown in FIG. 8 is used to control or treat a plurality of control object data pieces independently from each other, for example, in cases where there are a plurality of data segments divided as described above and where audio signals exist in a plurality of channels as shown in FIG. 7.

In this respect, an ID such as a number or the like may be assigned to the data segment of the audio signal. This ID may be added as a part of each signal. When making control such as reproduction of a signal, an arbitrary signal can be controlled by specifying the ID as the [Control Object Data ID] even if a plurality of audio signals exist.

By thus providing an ID like a number for every one of sequential pieces of data of audio signals and image signals as targets to be controlled, any arbitrary signal block can be controlled even if a plurality of signal blocks exist. This ID can be added by a method of providing each signal block with a header part or so.

Therefore, an ID code of the data as an object to be controlled may be contained in the control data. In addition, as will be described later, it is possible to contain an ID code indicating the type of the control signal, e.g., whether the signal as the object to be controlled is an audio signal, an image signal, or text data of a text signal.

Figure 9:
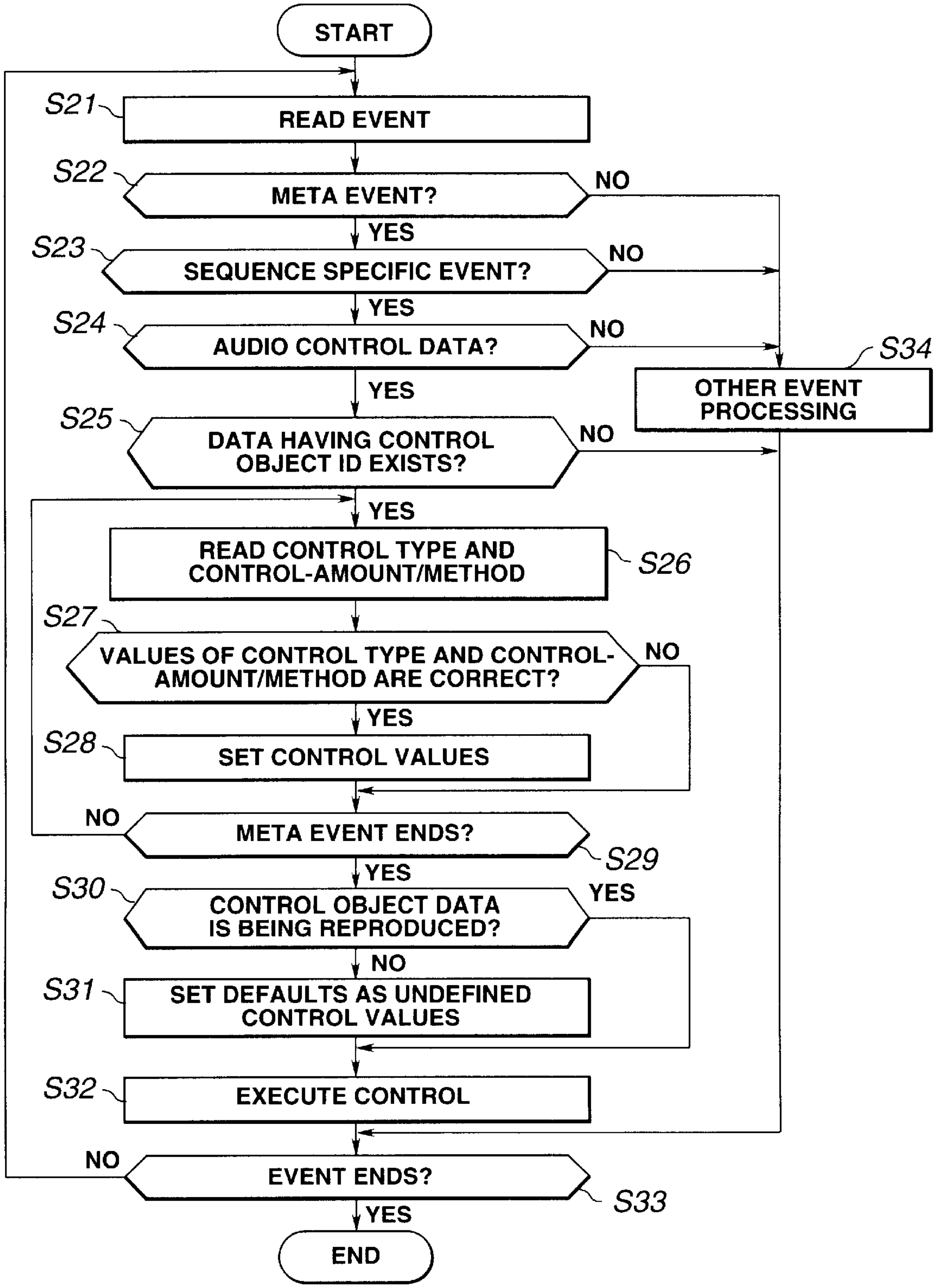
FIG. 9 is a flowchart for explaining operation of the digital signal processing apparatus when SMF data containing control data whose format is shown in FIG. 8 is supplied.
Figure 11:
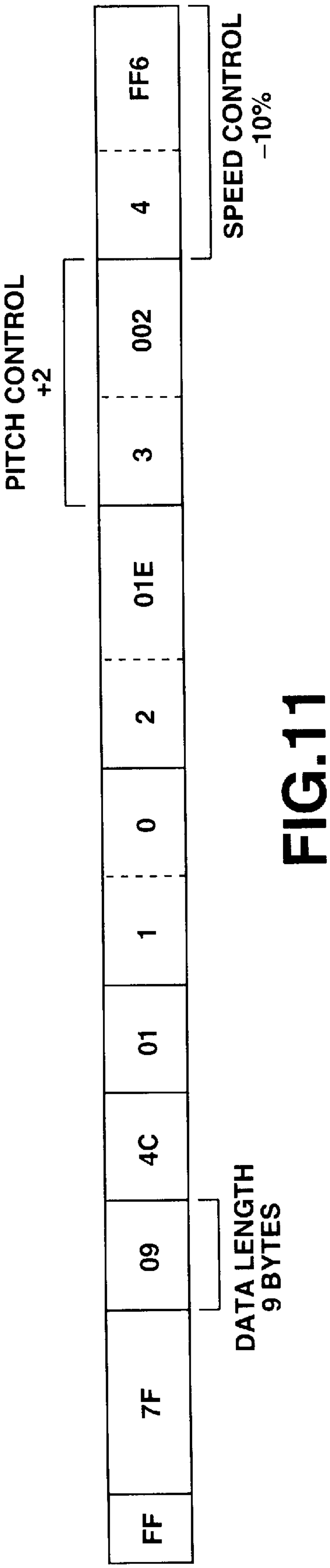
FIG. 11 is a diagram showing another specific example of control data whose format is also shown in FIG. 8.

With reference to the flowchart in FIG. 9, explanation will now be made of operation of the digital signal processing apparatus 10 shown in FIG. 1 when the SMF data having the structure shown in FIG. 8 and a vocal audio signal are supplied from the encoder side.

At first, the audio signal processing apparatus 10 takes in the SMF data into the data decoder section 11, and then, an event is read in the step S21. Further, in the step S22, whether or not the one byte indicating the event type of the MIDI data formatted in the SMF format is [FF] is determined. If this byte indicates [FF], the event is a Meta event and the procedure goes to the step S23.

Next, in the step S23, the [Event Type] is checked to determine whether or not it indicates [7F]. If it is [7F], the event is a sequencer specific event, so the procedure goes to the step S24. Further, whether or not audio control data is described in the sequencer specific event is determined in the step S24. If the audio control data is determined as having been written there, the procedure goes to the step S25.

Figure 6B:
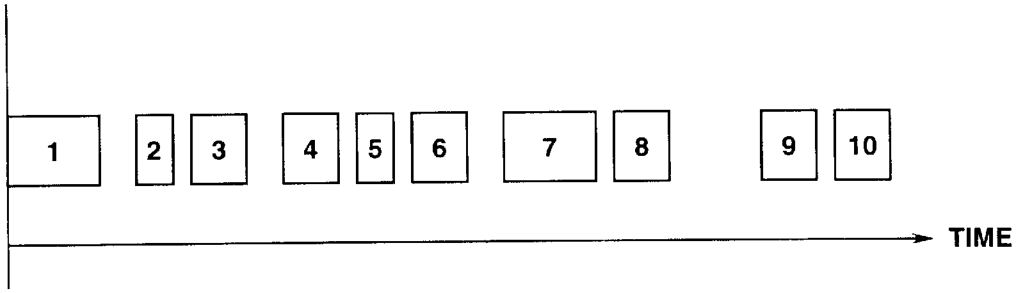
FIG. 6B is a diagram showing data of a plurality of default pieces obtained by cutting out silent parts in FIG. 6A.

In the step S25, whether or not data having a control object ID exists is determined. The determination processing in this step is applied in case where plural pieces of control object data exist, as shown in FIG. 6(*b*) or FIG. 7. If it is determined that data having a control object data ID exists, subsequent processing are carried out in the step S26 and later.

In the step S26, the digital signal processing apparatus 10 reads in the [Control Event ID] and the [Control-Amount/Control-Method] in the audio control data. Further, the data decoder section 11 determines whether or not the values read in the step S26 are correct, in the step S27.

In the step S28, upon receipt of the determination result that the control event ID and the bit string indicating the control-amount/control-method are correct, decoding of the audio signal is set in the audio decoder section 12. The procedure then goes to the step S29.

In the step S29, whether or not the audio control data of the Meta event ends is determined. In case where a plurality of pieces of audio control data are instructed, it is determined that the audio control data does not end. Then, the procedure returns to the step S26 and all the instructed control contents and the control-amount/control-method are read and set repeatedly.

Next, in the step S30, whether or not the control object data to be controlled is being reproduced is checked. This check is carried out to determnine whether or not undefined control values which have not been set through the loop for setting control values from the step S26 to the step S28 should be initialized to default values in the next step S31. If the control object data is being reproduced, the procedure goes to the step S32, and control is executed as follows.

Otherwise, if the control object data is not being reproduced, the procedure goes to the step S31, and the undefined control values are set to default values.

In the step S32, control on the audio signal is executed at the timing instructed by the time data added to the audio control data.

Further, in the step S33, whether or not a sequence of the event is ended is determined, i.e., whether or not the performance is finished is determined.

The processing in the step S34 is carried out to make other event processing, when the event is not determined as a Meta event in the step S22, when the event is not determined as a sequencer specific event in the step S23, or when audio control data is not determined as having been described in the sequence specific event in the step S24.

Figure 10:
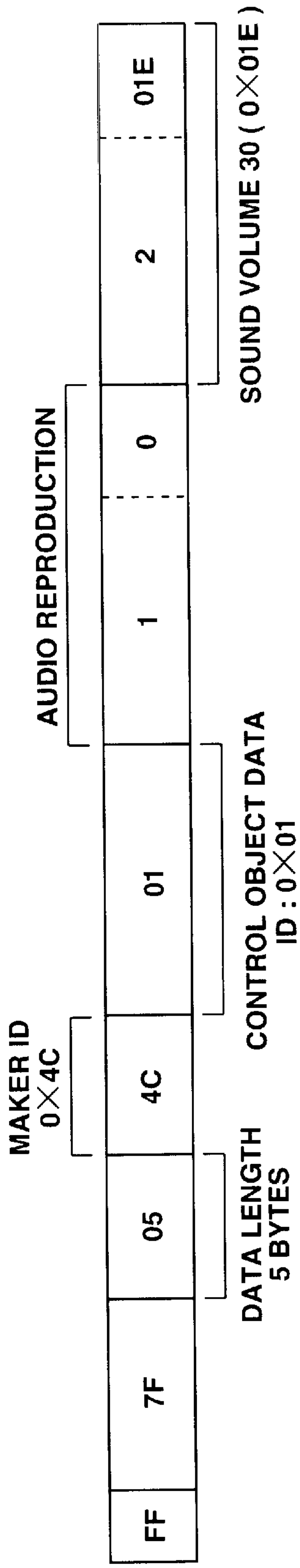
FIG. 10 shows an example of control data whose format is shown in FIG. 8.

For example, when the digital signal processing apparatus 10 is supplied with SMF data shown in FIG. 10 is supplied as a specific example corresponding to FIG. 8, the data decoder section 11 performs decoding that the ID [01] of a segment of audio data as shown in FIG. 6(*b*) or FIG. 7, since the [Control Object ID No.] is [01]. The data decoder section 11 also decodes start of audio reproduction based on the Table 1 because the [Control Event ID] is [1] and the [Control Method] is [0]. The data decoder section 11 decodes the volume of 30, because the [Control Event] is [2] and the [Control Amount] is [01E]. Therefore, the audio decoder section 12 is supplied with audio control data which instructs reproduction at the volume of 30. In this case, other controls than the contents described above are carried out, referring to default values.

In case where the pitch or speed of MIDI signal reproduction is changed, audio signal reproduction can be carried out so as to follow the change. An example thereof will be a control event in case of increasing the pitch by two degrees relatively to the original pitch and lowering the speed of MIDI signal reproduction by 10% relatively to the original speed.

In this case, where referring to the Table 1, the data as the control object is the audio signal assigned by the ID number 1. The pitch of the audio signal is increased by two degrees and the reproduction speed is lowered by 10% while default values (without control) are set for the other controls. Not only the timing of starting reproduction but also the pitch and speed can be synchronized with performed tone signals.

Note that the same operation as above applies to cases where the object to be controlled is an image signal, a text signal, or the like other than an audio signal. Also, it is possible to control digital signals other than a plurality of MIDI signals, e.g., audio signals and image signals.

Figure 12:
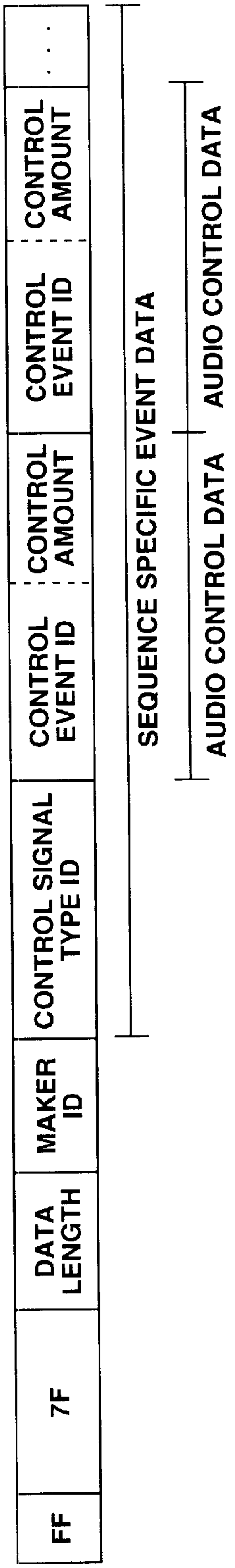
FIG. 12 is a format diagram showing control data added with an ID indicating the type of a control signal.

In this case, as shown in FIG. 12, the [Control Signal Type ID] indicating what the digital signal to be controlled is, such as an audio signal, image signal, or the like, is described in the control event. A method of enhancing the extendibility of control events by classifying the ID is adopted. More specifically, by indicating "0x01 for an audio signal", response is facilitated even if there are a plurality of types of digital signals as objects to be controlled or even if a new type of digital signal is added in the future.

Figure 13:
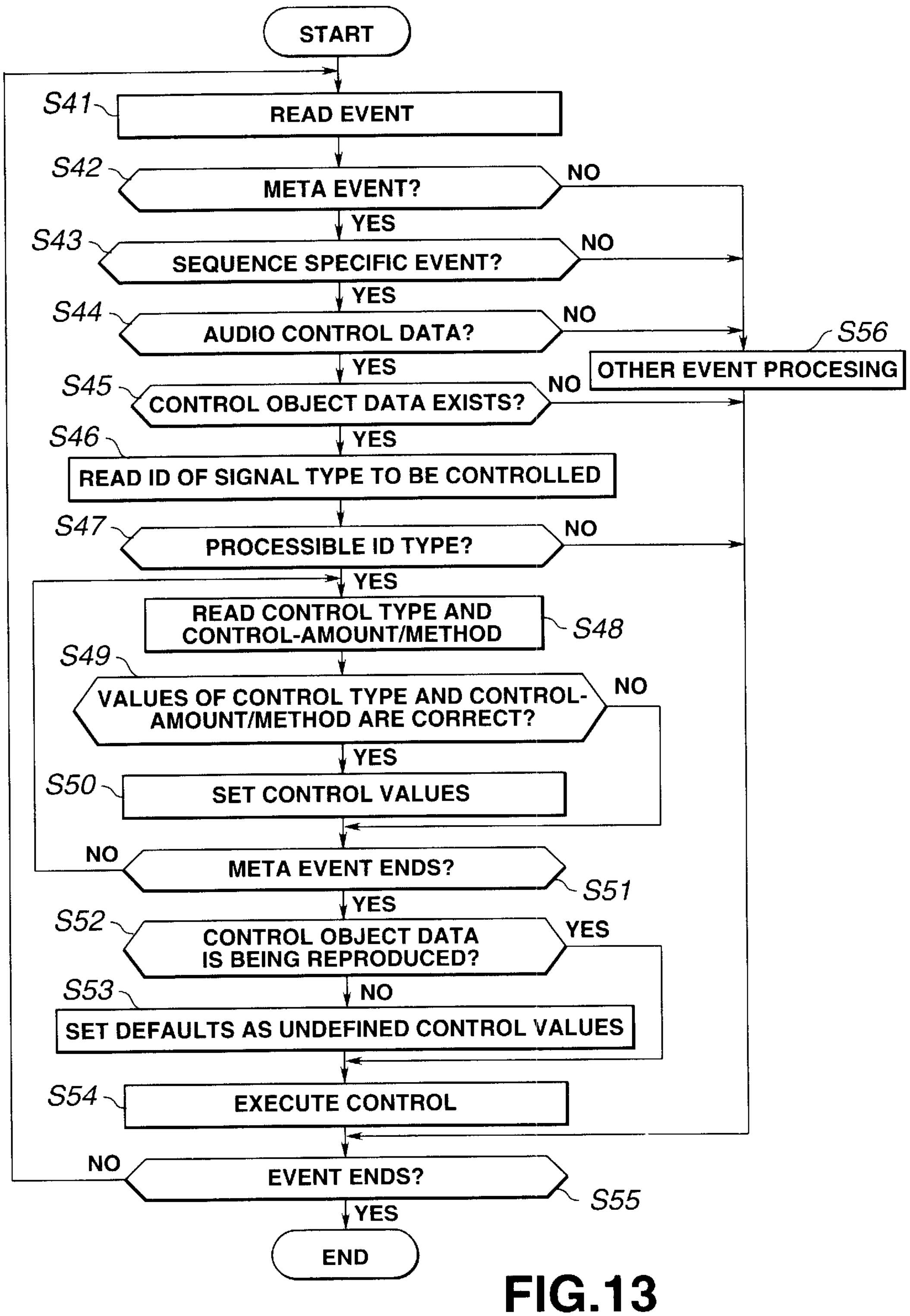
FIG. 13 is a flowchart for explaining operation of the digital signal processing apparatus when SMF data containing the control data whose format is shown in FIG. 12 is supplied.

With reference to FIG. 13, explanation will now be made of the operation of the digital signal processing apparatus when the SMF data shown in FIG. 12 is supplied from the encoder side. In this case, needless to say, the digital signal processing apparatus 10 does not only operate for application as a sequencer. Also, the audio decoder section 12 will be hereinafter referred to as only a decoder section 12.

First, the digital signal processing apparatus 10 takes in the SMF data into the data decoder section 11, and then reads an event in the step S41. Further, in the step S42, whether or not the one byte indicating the event type of the MIDI data is [FF] is determined. If this byte indicates [FF], the event is a Meta event, so the procedure goes to the step S43.

Next, in the step S43, the [Event Type] is checked to determine whether or not it indicates [7F]. If it is [7F], the event is a sequencer specific event, so the procedure goes to the step S44. Further, whether or not audio control data is described in the sequencer specific event is determined in the step S44. If the audio control data is determined as having been written there, the procedure goes to the step S45.

In the step S45, whether or not control object data exists is determined. If it is determined that control object data exists, subsequent processing are carried out in the step S46 and later.

In the step S46, the digital signal processing apparatus 10 reads in the [Control Signal Type ID] of the signal to be controlled in the audio control data. Note that the digital signal processing apparatus 10 determines whether or not the ID read in the step S46 is of a processible type, in the step S47. Specifically, the apparatus determines whether the ID thus read is of the processible type such as an audio signal, an image signal, text data, or the like. At this time, if the ID is determined to be processible, the procedure goes to the step S48. Otherwise, if it is determined as being not processible, the procedure jumps to the step S55.

Next, the digital signal processing apparatus 10 reads in the [Control Event ID] and the [Control-Amount/Control-Method] in the audio control data, in the step S48. Further, the data decoder section 11 determines whether or not the values thus read in the step S48 are correct, in the step S49.

If the control event ID and the bit string expressing the control-amount/control-method are determined to be correct in the step S49, the procedure goes to the step S50 and decoding of the audio signal is set. The procedure further goes to the step S51. In the step S49, if the control event ID and the bit string expressing the control-amount/control-method are not determined to be correct, the procedure goes to the step S51.

In the step S51, whether or not the audio control data of the Meta event ends is determined. In case where a plurality of pieces of audio control data are instructed, it is determined that the audio control data does not end. Then, the procedure returns to the step S48 and all the instructed control contents and the control-amount/control-method are read and set repeatedly.

Next, in the step S52, whether or not the control object data to be controlled is being reproduced is checked. This check is carried out to determine whether or not undefined control values which have not been set through the loop for setting control values from the step S48 to the step S50 should be initialized to default values in the next step S53. If the control object data is being reproduced, the procedure goes to the step S54, and control is executed as follows.

Otherwise, if the control object data is not being reproduced, the procedure goes to the step S53, and the undefined control values are set to default values.

In the step S54, control on the audio signal is executed at the timing instructed by the time data added to the audio control data.

Further, in the step S55, whether or not a sequence of the event is ended is determined, i.e., whether or not the performance is finished is determined.

Note that the processing in the step S56 is carried out to make other event processing, when the event is not determined as a Meta event in the step S42, when the event is not determined as a sequencer specific event in the step S43, or when audio control data is not determined as having been described in the sequence specific event in the step S44.

Meanwhile, the data decoder section 11 supplies the MIDI sound source 13 with MIDI signals decoded from the SMF data, to drive the MIDI sound source 13 to generate tones controlled by the MIDI signals.

The audio decoder section 12 receives audio control data decoded by the data decoder section 11, and decodes an audio output, image data output, or text data output in accordance with the data. If the decoding period in the audio decoder section 12 is sufficiently short, the MIDI output as performance tones and the output from the decoder section 12 are synchronized with each other.

Thus, when SMF data containing a Meta event in the format as shown in FIG. 12 is supplied, the digital signal processing apparatus 10 does not only reproduce the MIDI signals but also synchronously reproduces vocals, natural sounds, and the like, which are difficult to reproduce with musical reproduction according to the MIDI standard, in synchronization with the performance tones. Also, the type of control can be classified by the ID indicating the data as a control object to be controlled, so extendibility can be easily obtained. Accordingly, it is possible to display motion images, static images, and text information on the display, synchronized with the reproduction of MIDI signals.

In addition, if data as the control object is determined, it is possible to determine what type of the digital signal, such as an audio or image, the data is. Accordingly, what type of digital signal the control type belongs to can be determined, and thus, the type of control can be classified as has been described previously.

The operation of the digital signal processing apparatus 10 at this time will be explained with reference to the flowchart shown in FIG. 14. In this flowchart, the steps S46 and S47 shown in FIG. 13 are replaced with steps S60, S61, and S62.

First, the digital signal processing apparatus 10 takes in the SMF data into the data decoder section 11, and then reads an event in the step S41. Further, in the step S42, whether or not the one byte indicating the event type of the MIDI data is [FF] is determined. If this byte indicates [FF], the event is a Meta event, so the procedure goes to the step S43.

Next, in the step S43, the [Event Type] is checked to determine whether or not it indicates [7F]. If it is [7F], the event is a sequencer specific event, so the procedure goes to the step S44. Further, whether or not audio control data is described in the sequencer specific event is determined in the step S44. If the audio control data is determined as having been written there, the procedure goes to the step S45.

In the step S45, whether or not control object data exists is determined. If it is determined that control object data exists, subsequent processing are carried out in the step S60 and later.

In the step S60, the digital signal processing apparatus 10 determines what type the signal to be controlled is, from the data as the control object which has been determined as being existing.

Further, in the step S61, whether or not the type could be determined is determined. If the type could be determined, the procedure goes to the step S62 to determine whether or not the type of the signal which could be determined is of a processible type. If the type of the signal could not be determined in the step S61 or if the type is determined as being not processible in the step S62, the procedure goes to the step S55.

If the signal is determined as being of a processible type in the step S62, the procedure goes to the step S48.

In the step S48, the digital signal processing apparatus 10 reads in the [Control Event ID] and the [Control-Amount/Control-Method] in the audio control data. Further, in the step S49, the data decoder section 11 determines whether or not the values thus read in the step S48 are correct.

If the control event ID and the bit string expressing the control-amount/control-method are determined to be correct in the step S49, the procedure goes to the step S50, and decoding of the audio signal is set in the audio decoder section. The procedure further goes to the step S51. In the step S49, if the control event ID and the bit string expressing the control-amount/control-method are not determined to be correct, the procedure goes to the step S51.

In the step S51, whether or not the audio control data of the Meta event ends is determined. In case where a plurality of pieces of audio control data are instructed, it is determined that the audio control data does not end. Then, the procedure returns to the step S48 and all the instructed control contents and the control-amount/control-method are read and set repeatedly.

Next, in the step S52, whether or not the control object data to be controlled is being reproduced at present is checked. This check is carried out to determine whether or not undefined control values which have not been set through the loop for setting control values from the step S48 to the step S50 should be initialized to default values in the next step S53. If the control object data is being reproduced, the procedure goes to the step S54, and control is executed as follows.

Otherwise, if the control object data is not being reproduced, the procedure goes to the step S53, and the undefined control values are set to default values.

In the step S54, control on the audio signal is executed at the timing instructed by the time data added to the audio control data.

Further, in the step S55, whether or not a sequence of the event is ended is determined, i.e., whether or not the performance is finished is determined.

Note that the processing in the step S56 is carried out to make other event processing, when the event is not determined as a Meta event in the step S42, when the event is not determined as a sequencer specific event in the step S43, or when audio control data is not determined as having been described in the sequence specific event in the step S44.

Figure 14:
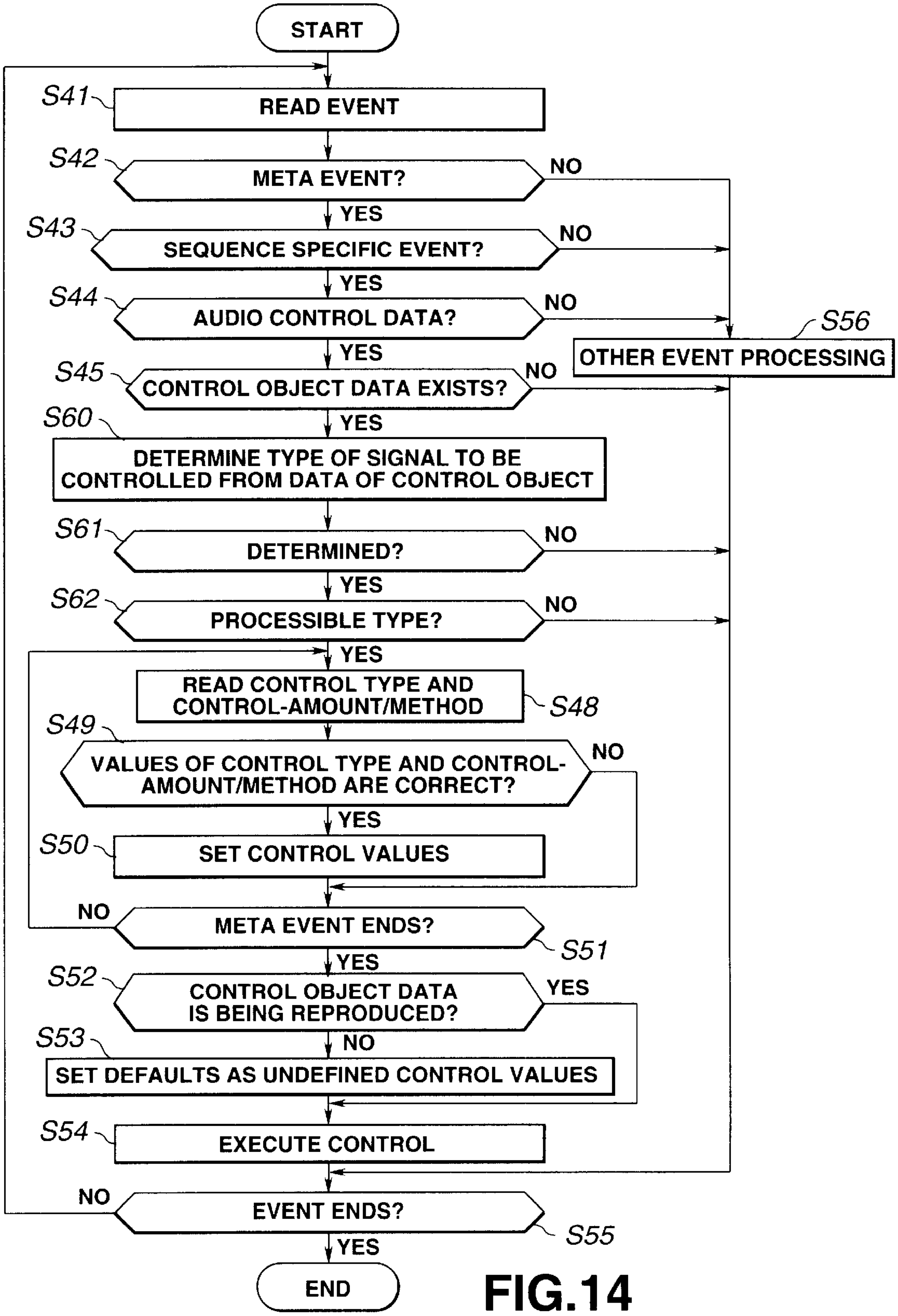
FIG. 14 is a flowchart for explaining operation of the digital signal processing apparatus when the type of a control signal as a control object is determined not from the ID but from the type or contents of data.

Thus, in the processing shown in FIG. 14, the digital signal processing apparatus 10 does not use the ID as described previously, to determine the type of the digital signal to be controlled, but determines the type of data from the form and information of the control object data.

As described above, digital signal such as audio signals and image signals, other than MIDI signals, can be controlled with use of a sequencer specific event. Also, in this manner, influences are not made on music reproduction according to the MIDI standard, and reproduction of MIDI signals can be carried out normally even if a sequencer or a sequencer software program does not correspond to the present invention.

The digital signal processing apparatus 10 as the embodiment described above realizes the digital signal processing method also described above. Note that the digital signal processing method can be applied in form of a software program.

A software program to which the digital signal processing method is applied is a program comprising a step of decoding control data previously encoded and described in interface data for an instrumental performance, which includes at least performance data for operating a sound source storing plural pieces of instrumental tone information so as to generate a performance tone of an instrument, and a step of decoding other digital signals than the signals of the performance tone, in correspondence with reproduction timing information of the performance data, based on the control data decoded in the previous step. The software program is stored in a recording medium such as a semiconductor memory, a magnetic disc, an optical disc, or the like.

Figure 15:
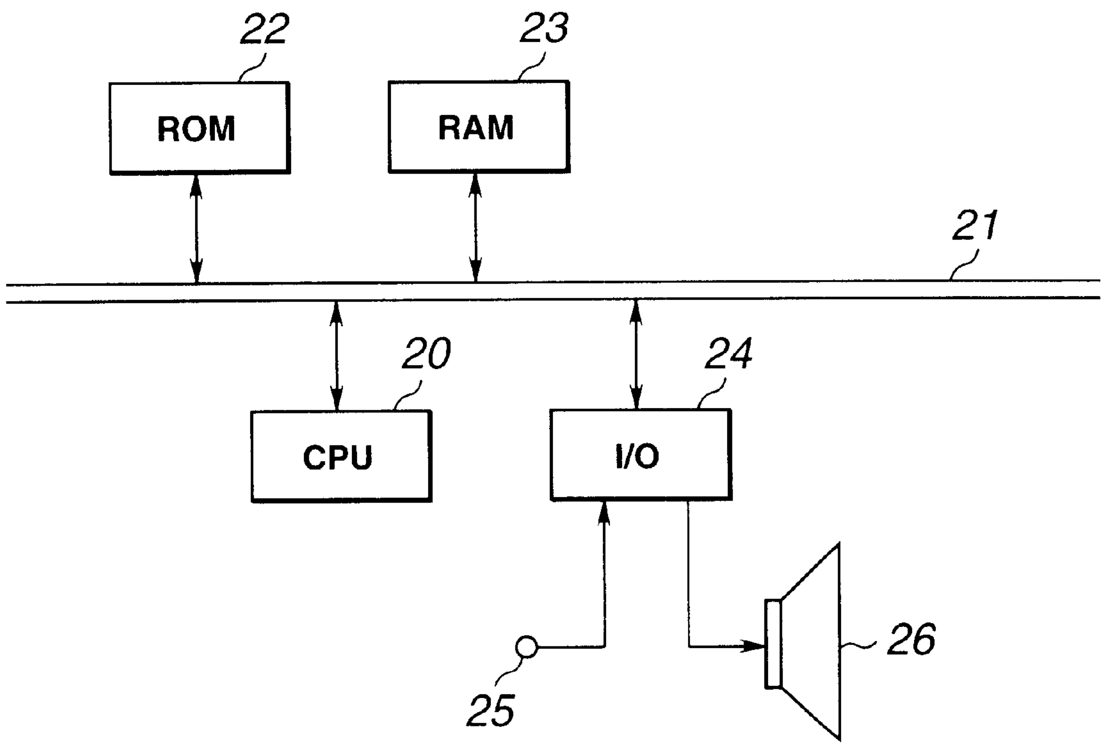
FIG. 15 is a block diagram showing the structure of a digital signal processing system having a CPU as a main component which extracts and executes a software program from a ROM as a program recording medium, according to the present invention.

FIG. 15 shows a structure of a digital signal processing system mainly based of a CPU 20 which extracts and executes commands from a ROM 22 storing the software program described above. The CPU 20 is connected with the ROM 22, a RAM 23 as a work area, and an I/O interface 24 through a bus 21. The I/O interface 24 is connected with an audio signal input terminal 25 and a speaker 26.

The CPU 20 extracts and executes a software program to which the above digital signal processing method is applied, from the ROM 22, on every occasion. The CPU 20 executes the software program thereby to make the same processing as the digital signal processing apparatus shown in FIG. 1. Further, an audio signal such as a vocal or the like supplied through the input terminal 25 and a performance tone signal from a MIDI sound source are synchronized and reproduced from the speaker.

Thus, in the digital signal processing system shown in FIG. 15, the software program stored in the ROM 22 is extracted and executed on occasion, so it is possible to realize synchronized reproduction of a performance tone signal described above and another digital signal, which has been considered to be difficult conventionally.

That is, the program recorded in the ROM 22 enables synchronous reproduction of a performance tone signal described above and another digital signal, at any place and for any person where an appropriated device is provided.

The signal which can be reproduced synchronously with the performance tone signal is not limited to an audio signal, but may be an image signal, text signal, or the like.

Figure 16:
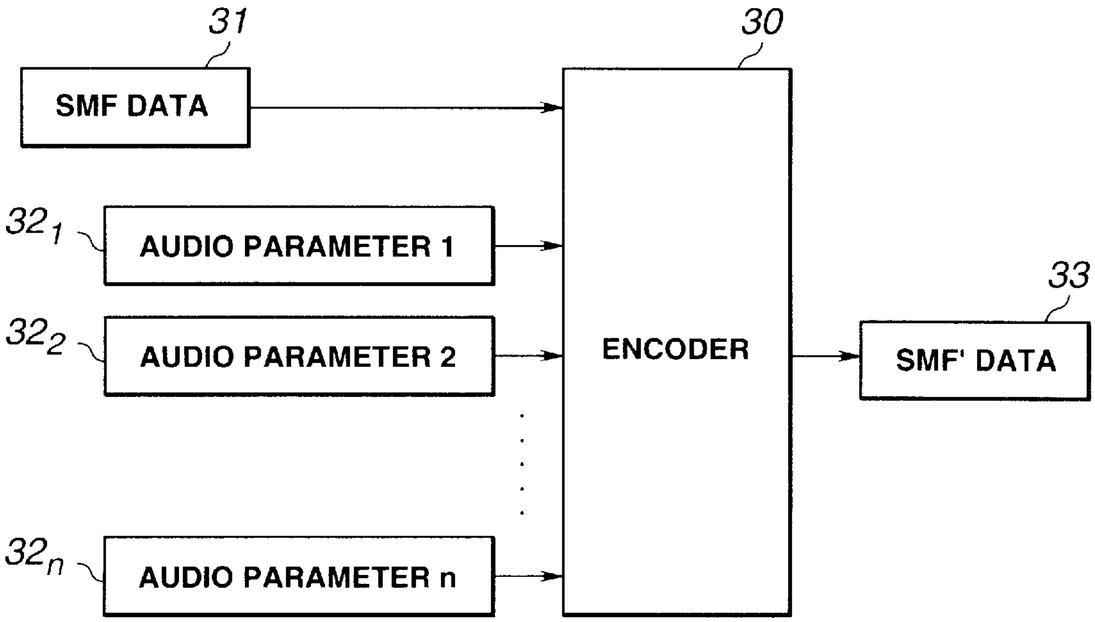
FIG. 16 is a diagram showing a specific example of an encoder for generating SMF data to be treated in the digital signal processing apparatus shown in FIG. 1 and the digital signal processing system shown in FIG. 15.

Next, with reference to FIG. 16, explanation will be made of a specific example of an encoder for generating SMF data which is processed by the digital signal processing apparatus 10 shown in FIG. 1 and the digital signal processing system shown in FIG. 16.

This specific example is an encoder 30 for generating the SMF data as interface data containing control data for synchronizing a digital signal other than a performance tone signal with the performance tone signal output from a sound source storing plural pieces of instrumental tone information.

The encoder 30 is supplied with SMF data 31 as input data. A MIDI event, a system exclusive event, and a Meta event are described in the track chunk of the SMF data 31.

Also to the encoder 30, a user inputs an audio signal such as a vocal and parameters $\mathbf{32}_1$, $\mathbf{32}_2$, $\mathbf{32}_n$. These parameters are used to synchronously reproduce a performance tone signal from a MIDI sound source and the audio signal.

The encoder 30 then generates SMF' data 33 in which audio control data consisting of the ID of the control event and the control-amount/control-method is described in sequencer specific event data at a predetermined position between events previously described.

Thus, according to the encoder 30 described above, it is possible to generate easily SMF' data containing audio control data for synchronizing the performance tone signal and another digital signal.

Of course, since the signal to be synchronized with the performance tone signal is not limited to an audio signal but may be an image signal, a text signal, or the like, the control data may be data for controlling a parameter indicating a display timing of an image signal or a text signal.

Note that the digital signal processing apparatus as the above-described embodiment is supplied with the SMF data and a digital signal other than the interface data described above, for example, through network media such as Internet or the like. However, these data pieces may be previously stored, for example, in a large capacity recording medium such as a hard-disc drive, an optical disc drive, or the like, and each data pieces may be read from the large capacity recording medium, to perform the digital signal processing described above.

As has been described above, according to the present invention, synchronized reproduction of a performance tone signal with a digital signal other than the performance tone signal, such as an audio signal or an image signal, can be achieved without influencing music reproduction according to the MIDI standard. For example, a sequencer or a sequencer software program which corresponds to the present invention does not merely reproduce a performance tone signal, but is capable of synchronously reproducing vocals or natural sounds by means of a digital audio signal, which are difficult to reproduce by music reproduction according to the MIDI standard.

In addition to the data of those digital signals including the performance tone signal that are previously maintained in a recording apparatus or a medium, streaming data on a network can be considered to be useful.

Further, not only the reproduction timing for an audio signal or an image signal but also various parameters can be controlled, so the parameters can be changed independently from performance tone signals. For example, an echo effect can be applied to an audio.

Inversely, parameters for an audio or image can be changed so as to follow a change made to reproduction of a performance tone signal. For example, when the pitch of a reproduced music depending on performance tone signals is changed, the pitch of a reproduced audio can be changed in accordance with the pitch change.

Thus, interactivity can be easily attained in synchronous reproduction of a performance tone signal and another digital signal.

Also according to the present invention, it is possible to interface data containing control data for synchronizing a performance tone signal and another digital signal with each other.

Furthermore, the above-described synchronous reproduction of a performance tone signal and another digital signal can be realized at any place by any person where an appropriate apparatus is available.

What is claimed is:

1. A digital signal processing method comprising a step of reproducing a performance tone signal based on interface data for an instrumental performance, which contains at least performance data for an instrumental performance, which contains at least performance data for causing a sound source storing plural pieces of instrumental tone information to generate a performance tone of an instrument, and a digital signal other than the performance tone signal, on the basis of control data previously encoded and described in the interface data, wherein the interface data includes an indication of a type of the digital signal other than the performance tone signal, and wherein the type comprises one of an audio signal, an image signal, and a text signal;

wherein the control data is previously described as an encoded data string in a predetermined event in a standard format of the interface data; and wherein the control data is described before a timing at which the control data is desired to be controlled, and timing information which is desired to be actually controlled is added in the control data.

2. A method according to claim 1, wherein the digital signal other than the performance tone signal is an audio signal.

3. A method according to claim 1, wherein the digital signal other than the performance tone signal is an image signal.

4. A method according to claim 1, wherein the digital signal other than the performance tone signal is a signal representing a character.

5. A method according to claim 1, wherein the control data is data for controlling a reproduction timing of the digital signal other than the performance tone signal.

6. A method according to claim 1, wherein the control data is data for controlling a parameter concerning reproduction of the digital signal other than the performance tone signal.

7. A method according to claim 1, wherein the control data is described at a timing at which the control data is desired to be controlled.

8. A method according to claim 1, wherein the timing information is expressed as a relative time between a timing at which the control data is described and a timing at which control is desired to be actually executed.

9. A method according to claim 1, wherein the timing information is expressed as an absolute time in entire reproduction.

10. A method according to claim 1, wherein the digital signal other than the performance tone signal has an identification code for every block.

11. A method according to claim 10, wherein a specific block signal is controlled by specifying the identification code.

12. A method according to claim 1, wherein the control data is data for specifying a type of the digital signal other than the performance tone signal.

13. A method according to claim 1, wherein the control data is data for simultaneously effecting a plurality of controls on the digital signal other than the performance tone signal.

14. A digital signal processing method comprising a step of reproducing a performance tone signal based on interface data for an instrumental performance, which contains at least performance data for an instrumental performance, which contains at least performance data for causing a sound source storing plural pieces of instrumental tone information to generate a performance tone of an instrument, and a digital signal other than the performance tone signal, on the basis of control data previously encoded and described in the interface data, wherein the interface data includes an indication of a type of the digital signal other than the performance tone signal, and wherein the type comprises one of an audio signal, an image signal, and a text signal;

wherein the control data is previously described as an encoded data string in a predetermined event in a standard format of the interface data; and wherein the control data is data which expresses each control-amount/control method of content of a control to be effected on the digital signal other than the performance tone signal.

15. A method according to claim 14, wherein the digital signal other than the performance tone signal is an audio signal.

16. A method according to claim 14, wherein the digital signal other than the performance tone signal is an image signal.

17. A method according to claim 14, wherein the digital signal other than the performance tone signal is a signal representing a character.

18. A method according to claim 14, wherein the control data is data for controlling a reproduction timing of the digital signal other than the performance tone signal.

19. A method according to claim 14, wherein the control data is data for controlling a parameter concerning reproduction of the digital signal other than the performance tone signal.

20. A method according to claim 14, wherein the control data is described at a timing at which the control data is desired to be controlled.

21. A method according to claim 14, wherein the control data is described before a timing at which the control data is desired to be controlled, and timing information which is desired to be actually controlled is added in the control data.

22. A method according to claim 21, wherein the timing information is expressed as a relative time between a timing at which the control data is described and a timing at which control is desired to be actually executed.

23. A method according to claim 21, wherein the timing information is expressed as an absolute time in entire reproduction.

24. A method according to claim 14, wherein the digital signal other than the performance tone signal has an identification code for every block.

25. A method according to claim 24, wherein a specific block signal is controlled by specifying the identification code.

26. A method according to claim 14, wherein the control data is data for specifying a type of the digital signal other than the performance tone signal.

27. A method according to claim 14, wherein the control data is data for simultaneously effecting a plurality of controls on the digital signal other than the performance tone signal.

* * * * *